United States Patent [19]
Schofield

[11] Patent Number: 5,043,667
[45] Date of Patent: Aug. 27, 1991

[54] METHOD OF MAGNETOTELLURIC EXPLORATION USING AREAL ARRAYS

[75] Inventor: James D. Schofield, Lakewood, Colo.

[73] Assignee: Amoco Corporation, Chicago, Ill.

[21] Appl. No.: 341,863

[22] Filed: Apr. 21, 1989

[51] Int. Cl.$^5$ .............................................. G01V 3/08
[52] U.S. Cl. ..................................... 324/350; 324/349
[58] Field of Search ............................... 324/348-350, 324/357, 323

[56] References Cited

U.S. PATENT DOCUMENTS

| | | | |
|---|---|---|---|
| 2,263,097 | 11/1941 | Marchand | 324/349 |
| 3,188,559 | 6/1965 | Yungul | 324/349 |
| 3,361,957 | 1/1968 | Hings | 324/349 |
| 4,286,218 | 8/1981 | Bloomquist et al. | 324/350 |
| 4,449,099 | 5/1984 | Hoehn | 324/350 |
| 4,591,791 | 5/1986 | Bostick, Jr. | 324/350 |
| 4,616,184 | 10/1986 | Lee et al. | 324/350 X |
| 4,686,476 | 8/1987 | Ranganayaki | 324/350 |
| 4,757,262 | 7/1988 | Bostick, Jr. | 324/350 |
| 4,792,761 | 12/1988 | King et al. | 324/350 |
| 4,811,220 | 3/1989 | McEuen | 324/350 X |
| 4,862,089 | 8/1989 | Sigal | 324/350 |

OTHER PUBLICATIONS

Torres-Verdin et al., "Simulation of EMAP Responses in Three-Dimensional Environments", pp. 168-171.
Pelton et al., "High-Density 3-D MT:Swath MT and Grid MT", pp. 179-181.
Cagniard, "Basic Theory of the Magnetotelluric Method of Geophysical Exploration", Geophysics, vol. 18, p. 605 (1953).
Bostick, "Electromagnetic Array Profiling", 50th Annual Meeting Society of Exploration Geophysicists, p. 60 (1986).
Clarke et al., "Squids and Magnetotellurics with a Remote Reference", American Institute of Physics, No. 44, p. 87 (1978).

Primary Examiner—Kenneth Wieder
Assistant Examiner—Warren S. Edmonds
Attorney, Agent, or Firm—Timothy D. Stanley

[57] ABSTRACT

A method of magnetotelluric exploration is described, wherein measures of the earth's electric and magnetic fields are obtained at a plurality of sensing locations comprising an areal array of sensing locations. Specifically, first and second components of the earth's electric field are measured at a plurality of sensing locations within an areal array of sensing locations whereby each of the components of the earth's electric field are spatially continuous. Additionally, first and second components of the earth's magnetic field are measured simultaneously at at least one location within the area covered by the areal arrays of sensing locations.

17 Claims, 3 Drawing Sheets

METHOD OF MAGNETOTELLURIC EXPLORATION USING AREAL ARRAYS

BACKGROUND OF THE INVENTION

The present invention relates generally to the field of geophysical exploration and more particularly to a method of magnetotelluric exploration employing measures of the earth's magnetic and electric fields.

The magnetotelluric method makes use of the propagation properties of electromagnetic waves in conducting media so as to obtain a measure of the earth's resistivity or conductivity as a function of depth. Since the magnetotelluric method employs naturally occurring magnetic and electric fields, it is referred to as a passive electrical method of exploration in contrast to active exploration methods wherein an electric generator is used to induce a signal. The earth's electromagnetic fields cause a flow of telluric current in the earth's crust which depends upon the conductivity or resistivity of the earth's geologic formations. If the conductivity or resistivity is calculated and displayed, geophysicists can infer information about the earth's geologic structure. This technique is particularly useful in areas where other geophysical survey methods are inadequate.

A first method of magnetotelluric exploration was described by Cagniard in "Basic Theory of the Magnetotelluric Method of Geophysical Exploration" Geophysics vol. 18 p. 605 (1953). This method consists of simultaneously measuring the variations in one horizontal component of the earth's electric field and an orthogonal component of the earth's magnetic field over an extended period of time. These measurements can then be converted into frequency components by means of a Fourier transform. The ratio of the frequency component of the electric field to that of the magnetic field is a wave impedance that is a function of frequency. Since the depth of penetration of an electromagnetic wave into the earth's formations is related to the square root of the earth's resistivity divided by the frequency of the electromagnetic wave and the conductivity of the earth's formation, the wave impedance can be used to estimate the conductivity or resistivity distribution in the earth's formations.

Cagniard made his estimate of the earth's resistivity distribution using a mathematical model in which the earth's resistivity varied only with depth, i.e., a one-dimensional model. Cagniard's method was subsequently refined by others to be used with both two- and three-dimensional models of the earth's conductivity or resistivity structure. The history of advances in magnetotelluric exploration has been one of a gradual appreciation of the complexity of the earth's geological structure triggering a search for new methods of collecting magnetotelluric data as well as new methods for deciphering such data so as to reliably interpret such complex structures. Until now, the magnetotelluric data collected within a region of interest have always been a subset of the complete electric and magnetic fields required to fully describe their spatial variations caused by complex geologic structures of the earth.

Typically, magnetotelluric exploration comprises laying out one or more discrete sensing sites at which orthogonal, horizontal components of the earth's electric field (e.g., $E_x$, $E_y$) and magnetic field (e.g., $H_x$, $H_y$) can be measured. It has also been found advantageous to also record the vertical component of the magnetic field ($H_z$). The sensing sites are considered discrete because the electric field measured at one sensing site is noncontinuous with the electric field measured at another sensing site. More simply, the electric field measurements obtained at one sensing site are spatially independent of the electric field measurements obtained at another sensing site.

As magnetotelluric exploration is currently practiced, an impedance tensor ($Z_{ij}$) is calculated for selected frequencies of the measured electric and magnetic fields obtained at each discrete sensing site. Each impedance tensor ($Z_{ij}$) can then be processed so as to effect a rotation of the coordinate axes along which the electric and magnetic fields were measured in an attempt to minimize the principal diagonal elements of the impedance tensor (i.e., $Z_{xx}$ and $Z_{yy}$). For resistivity structures which are truly two-dimensional, the principal diagonal elements ($Z_{xx}$ and $Z_{yy}$) must be zero. Consequently, the magnetotelluric data can then be processed as if there existed a horizontal direction along which the earth's resistivity is assumed constant. By convention, such direction of constant resistivity is referred to as the strike direction. The components of the electric and magnetic fields can thus be separated into elements parallel and perpendicular to the strike direction.

Prior art magnetotelluric methods work well when the area being surveyed has a resistivity distribution which varies only in one or two dimensions. Unfortunately, such one- and two-dimensional variations represent only a small minority of the actual resistivity distributions in the earth. When magnetotelluric measurements are made over a structure having other than a simple one-or two-dimensional resistivity distribution (e.g., three-dimensional), the following problems can be encountered. First, it is generally not possible to identify an acquisition coordinate system based on strike direction. Hence, whatever acquisition coordinate system is used, it is not always possible to separate the electric field into components either parallel or perpendicular to the strike direction. Moreover, the main disadvantage of conventional magnetotelluric methods is that they can give unreliable results when the conductivity of the earth's subsurface formations vary in all three dimensions because the sensing sites are isolated one from another such that the measurements obtained at one sensing site are independent of measures obtained at another sensing site. Prior attempts to overcome this unreliability have involved large computational and human efforts.

More recently, Bostick described in "Electromagnetic Array Profiling," 50th Annual Meeting Society of Exploration Geophysicists, page 60 (1986) a method of electromagnetic surveying which can give more reliable results in the presence of certain forms of three-dimensional variations in the earth's resistivity the so-called "statics" effect. Bostick's electromagnetic array profiling (EMAP) method consists of measuring variations in the earth's magnetic field along two horizontal nonparallel directions at one point in an area to be surveyed and simultaneously measuring one component of the earth's electric field at a plurality of sensing sites along a generally linear survey line. Additionally, the electric field measurements made at the plurality of sensing sites are not spatially independent of one another and thus can be said to be continuous.

While Bostick's method is an improvement with regards to solving the statics problem, it represents a step backwards since the resultant of such a method is a scalar without the directional information contained in the impedance tensor of traditional magnetotelluric exploration.

As a consequence of measuring only one electric dipole component of the earth's electric field along the line of profile, the EMAP technique cannot measure the complete impedance tensor along the line of profile as with the conventional magnetotelluric method of exploration nor can the EMAP method determine the strike direction of the earth's formations. Additionally, the EMAP technique cannot truly generate two-dimensional estimates of the earth's resistivity structure. Rather, the EMAP technique generates a continuous series of one-dimensional estimates of the earth's resistivity structure along the line of profile so as to emulate a two-dimensional profile of the earth's substructure. Thus, the EMAP technique barters reduced acquisition and collection costs for reduced information about the earth's resistivity structure.

In spite of the advances in magnetotelluric exploration, present methods of magnetotelluric data acquisition and processing remain unreliable for three-dimensional variations in the earth's resistivity distribution. In view of such shortcoming, the present invention provides a novel method of magnetotelluric exploration for collecting and processing magnetotelluric data so as to provide more reliable estimates of the earth's resistivity structure, especially when the earth's resistivity structure is not simply one- or two-dimensional.

SUMMARY OF THE INVENTION

The present invention relates generally to a method of geophysical exploration and, more particularly, to a method of magnetotelluric exploration. The method of the present invention includes novel methods for collecting and processing magnetotelluric data.

In one embodiment of the invention, a method of areal magnetotelluric exploration is described wherein first and second horizontal components of the earth's electric field are measured about a plurality of sensing locations within an areal array of sensing locations. Simultaneously, with the measurement of the earth's electric field at each sensing location within the areal array, first and second horizontal components of the earth's magnetic field are measured at selected locations within the areal array of sensing locations. In one aspect of the invention, the areal array of sensing locations comprises an orthogonal array of sensing locations. An important feature of the present invention is that the electric field measurements obtained about the areal array of sensing locations are spatially continuous.

In another aspect of the invention, the areal array of sensing locations are positioned on the earth's surface employing a two-dimensional coordinate or grid system so that first horizontal components of the earth's electric field measured about each sensing location are generally parallel to a first axis of the two-dimensional coordinate system and second horizontal components of the earth's electric field measured about each sensing location are generally parallel to a second axis of the two-dimensional coordinate system. Preferably, the two-dimensional coordinate is an orthogonal coordinate system, i.e., the first axis is perpendicular to the second axis of the two-dimensional coordinate system. Consequently, the measured first and second horizontal components of the earth's electric field are orthogonal. Simultaneous with the measurement of the electric field, first and second horizontal components of the earth's magnetic field are measured at selected sensing locations within the areal array of sensing locations. Preferably, the first and second components of the magnetic field are measured along the first and second axes of the two-dimensional coordinate system or are computationally rotated so as to be parallel with the first and second axes of the two-dimensional coordinate system.

In another aspect of the invention, an areal array of magnetotelluric data can be collected employing a "roll-along" technique wherein orthogonal horizontal components of the earth's electric field are measured about each sensing location in a first collinear subarray of sensing locations simultaneously with measuring of at least two components of the earth's magnetic field. The electric field sensing equipment can then be repositioned at sensing locations along a second collinear subarray of sensing locations and simultaneous measures of the earth's electric and magnetic fields can be obtained, and so on, until the entire region of interest has been covered. Preferably, the first and second collinear subarrays of sensing locations are generally parallel and the interval L between adjacent sensing locations within any subarray is generally less than ten times the interval ( over which an electric dipole is measured along the longitudinal axis of the subarray. Moreover, the transverse interval L between corresponding sensing locations in adjacent subarrys is generally less than ten times the interval ( over which an electric dipole is measured along the transverse axis of the subarray.

Having collected an areal array of magnetotelluric data, novel methods of processing the magnetotelluric data to generate three-dimensional maps of the earth's subsurface geological structure are also included in the present invention. In particular, synthetic magnetotelluric data along arbitrary lines of profile can be generated from the areal collection of magnetotelluric data. More significantly, such areal collection of magnetotelluric data eliminates the necessity for laying out magnetotelluric lines of survey coincident with specified directions since the areal collection of magnetotelluric data can be synthetically rotated to coincide with any horizontal direction. Unlike conventional magnetotelluric exploration methods, the areal collection of magnetotelluric data is amenable to two-dimensional filtering methods to remove the effects of near surface features in generating maps of the earth's geological structure. Because the present invention produces a complete description of the spatial variations of the electric and magnetic fields, one can downwardly continue the electric and magnetic fields to selected depths within the earth. Downward continuation of the electric and magnetic fields to arbitrary depths, greatly enhances the geophysicist's ability to decipher the earth's geologic structure.

DETAILED DESCRIPTION OF THE INVENTION

Figure 1:
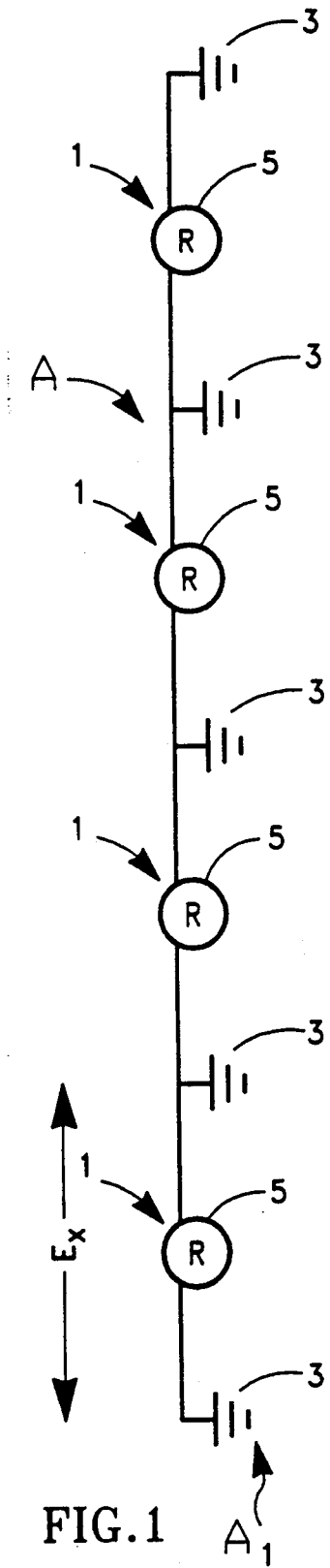
FIG. 1 represents an areal array A of sensing locations according to the present invention.
Figure 1:
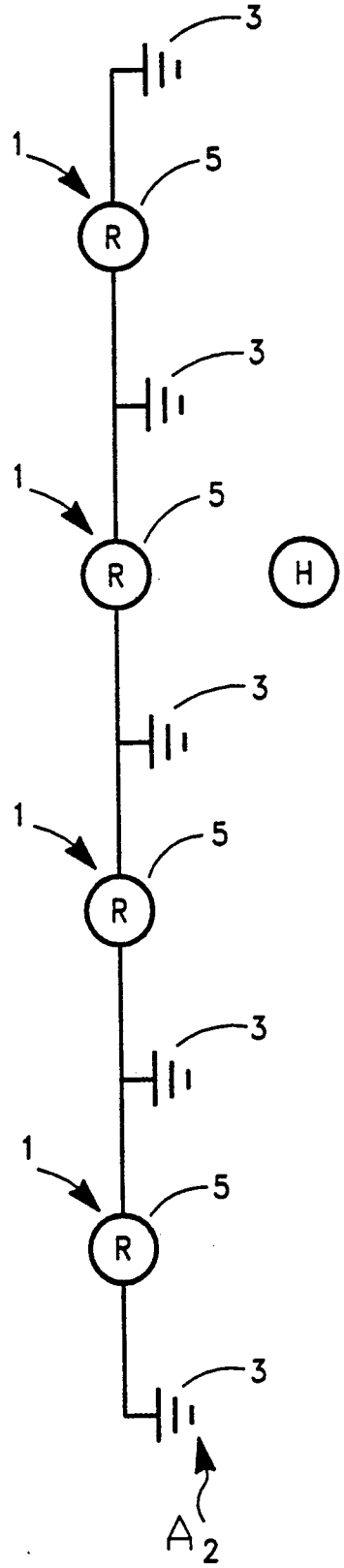
Figure 1:
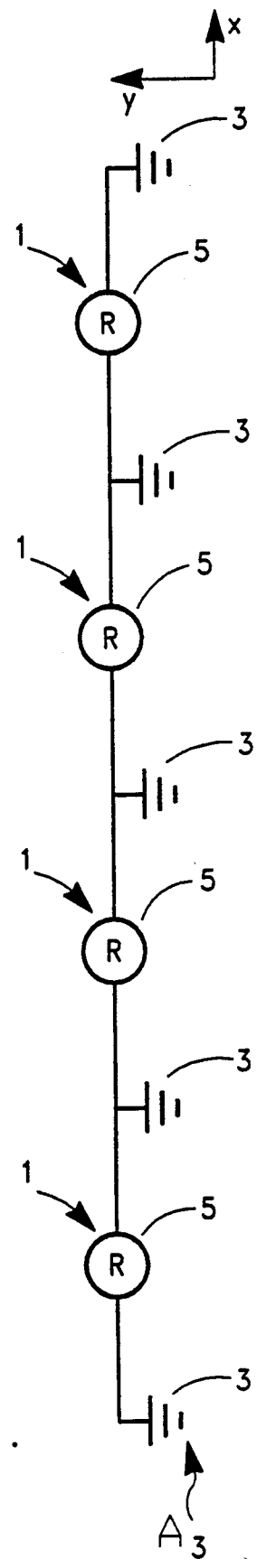

The present invention relates generally to a method of geophysical exploration and, more particularly, to a method of magnetotelluric exploration.

To better understand the present invention, the following brief discussion of magnetotelluric exploration is provided. Generally, magnetotelluric exploration uses the propagation properties of electromagnetic waves in the earth's subsurface formations to obtain measures of the earth's resistivity as a function of depth. Measures of the earth's electric field can be obtained by measuring the potential difference between two electrodes planted in the earth and separated by a known distance l. Conventionally, such potential difference measurements are referred to as electric dipoles. Additionally, measures of the earth's magnetic field can be obtained using magnetometers.

By simultaneously measuring two orthogonal components of the earth's magnetic field (e.g., $H_x$, $H_y$) and electric field (e.g., $E_x$, $E_y$), at the earth's surface, one can obtain a complete measure of the earth's impedance tensor. More formally, the electric field and magnetic field measurements can be related to elements of the earth's impedance tensor $Z_{ij}$ according to:

$$E_x = Z_{xx} H_x + Z_{xy} H_y \quad (1)$$

and $$E_y = Z_{yx} H_x + Z_{yy} H_y \quad (2)$$

where $E_x$ and $E_y$ are orthogonal electric dipole components of the earth's electric field; $H_x$ and $H_y$ are orthogonal components of the earth's magnetic field; and $Z_{xx}$, $Z_{yy}$, $Z_{yx}$, as $Z_{xy}$ are elements of the earth's impedance tensor $Z_{ij}$ This may be expressed more simply by the tensor relationship:

$$E_i = \sum_j Z_{ij} H_j \quad (3)$$

Since equations (1) and (2), or more simply (3), include four unknowns ($Z_{xx}$, $Z_{xy}$, $Z_{yx}$, and $Z_{yy}$), solutions thereto can be obtained by collecting multiple sets (i.e., at different times) of the electric field and magnetic field measurements so as to obtain a least squares fit solution to these equations. Having obtained measures of the elements of the impedance tensor $Z_{ij}$, those skilled in the art will appreciate that there exist well-known techniques for obtaining estimates of the earth's resistivity structure therefrom.

It has been discovered that the impedance tensor element $Z_{ij}$ solutions to equation (3) can be used to characterize the earth's subsurface formations. For earth resistivity models having only one-dimensional variations (i.e., vertical), the impedance tensor element $Z_{xx}$ or $Z_{yy}$ is 0 for any measurement direction and the impedance tensor elements $Z_{xy} = -Z_{yx}$. For two-dimensional variations, the magnitude of the impedance tensor elements $Z_{xy}$ and $Z_{yx}$ have a maximum or minimum parallel or perpendicular to the strike direction of a formation, and the impedance tensor elements $Z_{xx}$ and $Z_{yy}$ are zero parallel to the strike direction and perpendicular to the strike direction. For three-dimensional variations there exist no special directions, and all four impedance tensor elements $Z_{ij}$ are non-zero and are needed for evaluation of the earth's resistivity structure.

Once solutions to Equations (1) and (2), or more simply (3), have been found, one can determine the azimuthal angle of rotation $\Omega$ which minimizes the diagonal impedance tensor elements (i.e., $Z_{xx}$, $Z_{yy}$) and maximizes the off-diagonal impedance tensor elements (i.e., $Z_{xy}$, $Z_{yx}$). The angle of rotation $\Omega$ can then be used to synthetically rotate the acquisition coordinate system, along which the measurements of the earth's electric and magnetic fields were obtained, into a set of two orthogonal axes. One of the two orthogonal axes can then be aligned parallel with the strike direction of the earth's subsurface formations.

To determine which of the two orthogonal axes is parallel to the strike direction, a third orthogonal component of the earth's magnetic field can be used (i.e., Hz). The three orthogonal components of the earth's magnetic field ($H_x$, $H_y$, $H_z$) can be related according to:

$$H_z = T_x H_x + T_y H_y \quad (4)$$

where $T_x$ and $T_y$ are tipper functions.

The angle of rotation $\Omega$, which minimizes $T_y$ and maximizes $T_x$ can then be used to estimate the strike direction.

Since the earth's magnetic field varies more slowly as a function of spatial location than the earth's electric field, it is not necessary to sense and record components of the earth's magnetic field at every location at which the earth's electric field is sensed and recorded when closely spaced magnetotelluric-type exploration methods are used. A first estimate of closely spaced electric field measurements is that the overall horizontal extent of measuring the electric field is small when compared to the vertical depth of investigation.

Typically, magnetotelluric exploration has been conducted employing irregular, discrete sensing locations as described by Clarke et al., in "Squids and Magnetotellurics With a Remote Reference" American Institute of Physics No. 44, page 87 (1978). More recently, others such as Bostick or Bloomquist et al., in U.S. Pat. No. 4,286,218 describe magnetotelluric exploration techniques employing substantially linear arrays of sensing locations. In fact, since the EMAP method described by Bostick does not measure and record two orthogonal electric dipole components of the earth's electric field at each sensing location, solutions to the complete impedance tensor of Equation (3) cannot be obtained. Rather, by constraining the line of profile to be generally perpendicular to the strike direction, the EMAP technique can provide a series of one-dimensional measures of the impedance tensor as previously discussed.

Unlike prior magnetotelluric exploration techniques, the present method of magnetotelluric exploration comprises an areal array of sensing locations for measuring components of the earth's magnetic and electric fields. The areal array of sensing locations is laid out employing a two-dimensional coordinate system. Preferably, such coordinate system is an orthogonal system having X-Y axes.

Looking now to FIG. 1, an areal array A of sensing locations 1 can be deployed on the earth's surface for measuring a first component $E_x$ of the earth's electric field. It will be understood that each sensing location 1 includes a pair of spaced apart electrodes 3 planted in the earth's surface and a recorder 5 for recording a measured potential difference or electric dipole $E_x$ between the spaced apart electrodes 3. The subscript x of the measured electric dipole $E_x$ indicates that the electric dipole is measured generally parallel to the X-axis of the areal array coordinate system. In particular, the areal array A of measuring locations can include at least two separate subarrays (for example $A_1$, $A_2$, $A_3$) of collinear sensing locations 1. Preferably, such separate subarrays ($A_1$, $A_2$, $A_3$) of collinear sensing locations 1 are substantially parallel to one another.

Figure 2:
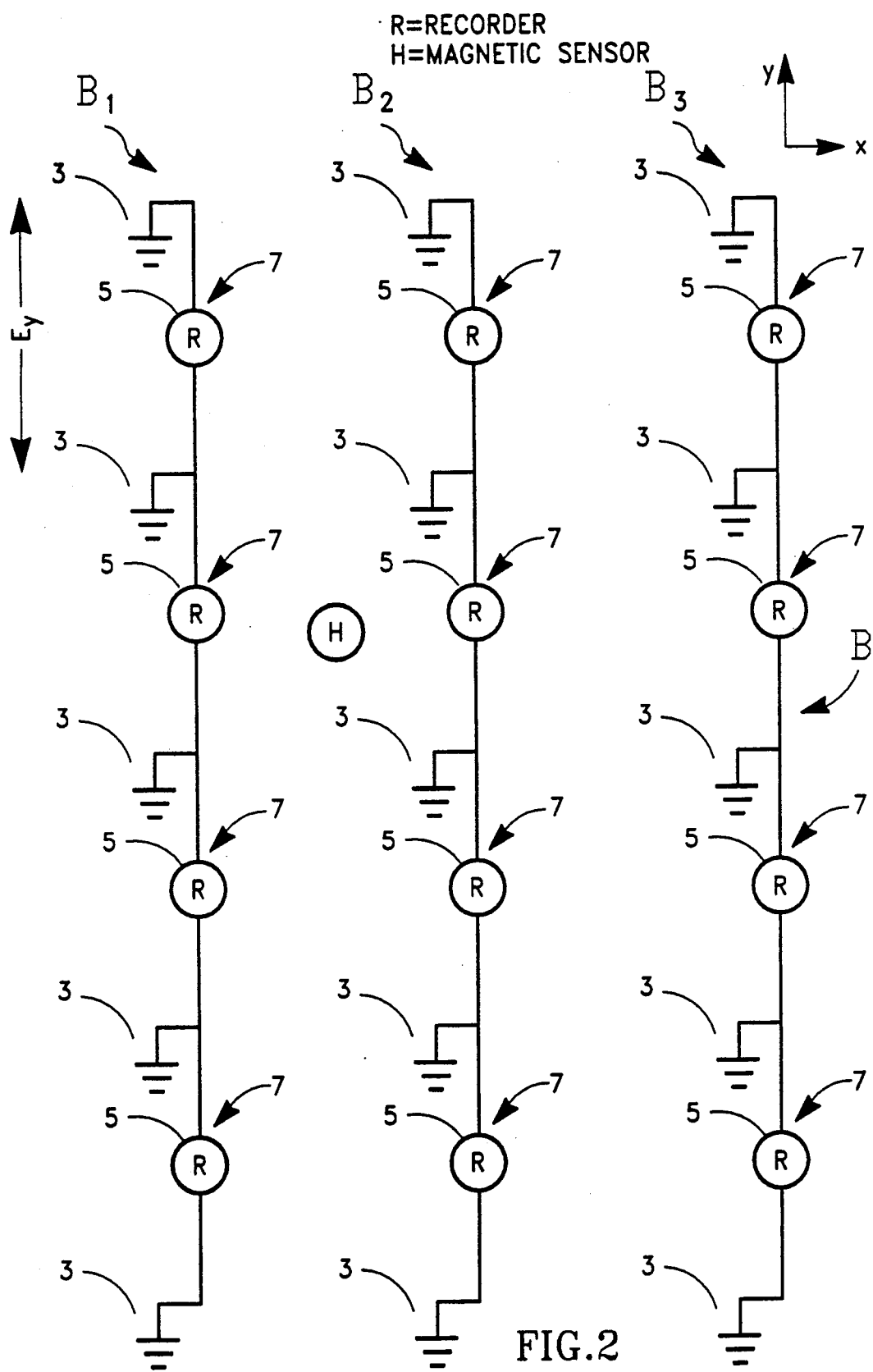
FIG. 2 represents an areal array B of sensing locations according to the present invention.

Looking now to FIG. 2, a plurality of sensing locations 7 for measuring a second component $E_y$ of the earth's electric field are deployed in an areal array B on the earth's surface encompassing generally the same region of interest as that of areal array A. In FIG. 2, the electric dipoles $E_y$ measured are generally parallel to the Y-axis of the coordinate system, as indicated by the subscript y of the measured electric dipole $E_y$. It will be understood that each sensing location 7 includes a pair of spaced apart electrodes 3 planted in the earth's surface and a recorder 5 for recording a measured potential difference or electric dipole $E_y$ between the spaced apart electrodes. In particular, the areal array B of sensing locations 7 can include at least two separate subarrays (for example, $B_1$, $B_2$ $B_3$) of collinear sensing locations 7. Preferably, such separate subarrays ($B_1$, $B_2$, $B_3$) of collinear sensing locations 7 are substantially parallel to one another.

Figure 3:
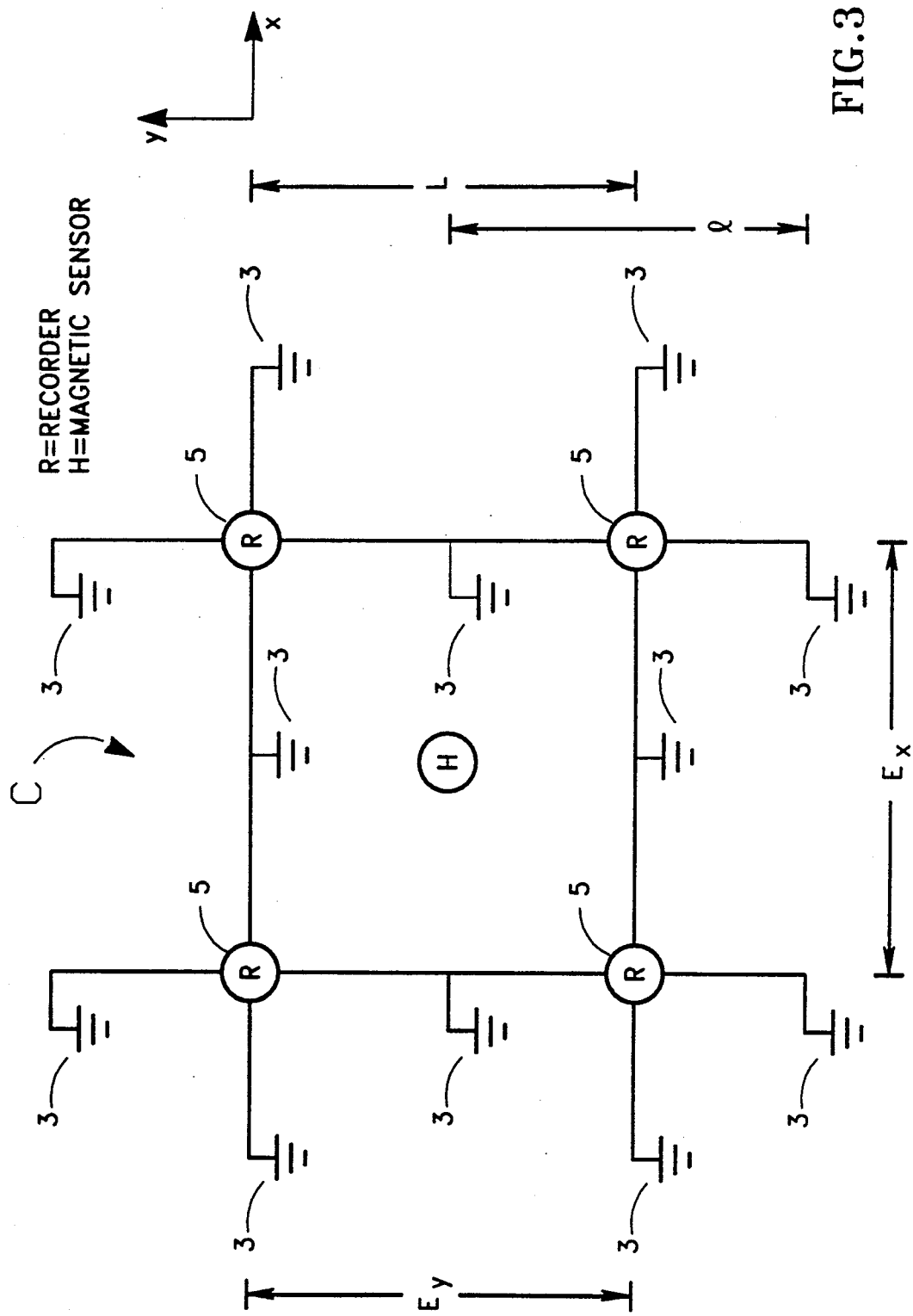
FIG. 3 represents an areal array C of sensing locations according to the present invention.

Although the areal arrays of sensing locations A and B shown in FIGS. 1 and 2 can be separate, efficiency and economics of exploration generally dictate that the corresponding sensing locations of each array be coincident as represented by areal array C in FIG. 3. That is, first and second horizontal components (e.g. $E_x$ and $E_y$) of the earth's electric field are typically simultaneously measured and recorded about the same general location on the earth's surface. In fact, if the corresponding two components of electric field (i.e., $E_x$, $E_y$) are not measured at substantially the same sensing location, an uncertainty can be introduced into the determination of the earth's resistivity structure. Additionally, the two components of electric field obtained at each corresponding sensing location within an areal array are measured simultaneously with the measurement of the two components of the earth's magnetic field.

An important aspect of the present invention comprises obtaining spatially continuous measures of the earth's electric field. By the fact that adjacent measures of one component of the earth's electric field share a common electrode 3 as depicted in FIGS. 1, 2 and 3, the electric dipoles are said to be spatially continuous along the earth's surface. However, it will be appreciated by those skilled in the art that the electric dipole measurements need not be measured over adjacent, consecutive intervals (as depicted in FIG. 3) in order to be considered spatially continuous if the interval l over which the electric dipoles are measured is not less than 1/10 the center-to-center spacing L between adjacent sensing locations.

Since the objective of magnetotelluric exploration is to obtain an estimate of the earth's resistivity structure, it is also necessary to obtain a measure of the earth's magnetic field simultaneous with the measures of the earth's electrical field. In practice, at least two components of the earth's magnetic field ($H_x$, $H_y$, $H_z$) orthogonal to the components of the earth's electrical field are obtained at at least one sensing site (not shown) within the area encompassed by the sensing locations of FIGS. 1, 2 or 3.

The interval l over which the electric dipoles are measured is dictated by the geologic structure at each area of investigation. Consequently, dipole lengths l can vary from 300 ft to 10,000 ft. When the electric dipoles $E_x$ and $E_y$ are measured over intervals l of approximately 1000 ft and the distance between adjacent sensing locations L is less than 1 km, the areal array of sensing locations can be considered closely spaced. Consequently, measuring components of the earth's magnetic field at as few as one sensing site within the areal array can be sufficient. However, as the extent of the areal array becomes larger, more magnetic field measurements can be included. Present technology limits the number of sites for measuring components of the magnetic field due to the high cost of magnetometers needed to make such measurements. However, high-temperature, superconducting SQUIDS may lessen the costs associated with measuring components of the earth's magnetic field so that magnetic field measurements could be obtained at each electric field sensing location. In any event, the weighting of distant magnetic field measurements for use with individual electric field measurements obtained at sensing locations intermediate magnetic field sensing locations as described by Bostick in U.S. Pat. No. 4,757,262 can be employed.

In operation, an areal array of magnetotelluric data can be obtained in a variety of ways. First, electric field and magnetic field measurements can be obtained simultaneously at a plurality of sensing locations comprising an areal array as depicted in FIG. 3. Second, simultaneous electric field and magnetic field measures can be independently obtained at each of a plurality of sensing locations comprising an areal array since magnetotelluric data are not time dependent. Third, electric field and magnetic field measurements can be obtained simultaneously along a first subarray of sensing locations of the areal array, such as A1 in FIG. 1, and then the electric field sensing equipment can be "rolled" to the next subarray of the areal array such as A2. When using the roll-along technique, measures of both the first and second components (e.g., $E_x$, $E_y$) of the earth's electric field are obtained concurrently at each sensing location within the subarray A1 of the areal array A of sensing locations. Simultaneously, measures of at least two components ($H_x$, $H_y$) of the earth's magnetic field are obtained from at least one of the sensing locations within the areal array A. Upon completion of the collection of the magnetotelluric data in the subarray $A_1$, the electric field sensors are relocated to the next adjacent subarray of measuring locations, for example $A_2$, and the process can then be repeated until the area of interest encompassed by the areal array A is covered. Preferably, as the subarrays are rolled from one location to the next, the electric field measures are spatially continuous along both the X and Y axes. That is, measures of the earth's electric field from one sensing location to the next adjacent sensing location, along either of X or Y axis, either share a common electrode as depicted in FIG. 3 or the center-to-center distance L between seismic locations is no greater than ten times the interval l over which the electric dipoles are measured.

An areal array of magnetotelluric data, collected in accordance with the present invention, is more versatile than either conventional magnetotelluric data or EMAP data. In particular, a complete impedance tensor, according to Eq. (3), can be calculated at any location within the areal array. Further, EMAP-like processing can be performed along any horizontal, azimuthal direction and not simply along the single direction in which EMAP data are obtained. Significantly, if the first or second axis of the areal strike array is not laid out so as to coincide with the strike direction, magnetotelluric data usable with EMAP-like processing can still be obtained by a rotation of the magnetotelluric data to the appropriate axis.

Unlike the EMAP exploration technique which is simply a profiling technique, the areal array of magnetotelluric data collected in accordance with the present invention can be spatially filtered. Moreover, since the magnetotelluric data provide a complete description of the earth's electric and magnetic fields within the area of interest, downward continuation methods can be applied to develop estimates and displays of the earth's resistivity structure.

While a particular embodiment of the invention has been shown and described, modifications thereto will be readily apparent to those skilled in the art without departing from the principles of the invention. Accordingly, the invention in its broader aspects is set forth in the appended claims.

What is claimed is:

1. A method of magnetotelluric exploration, comprising the steps of:
   (a) establishing an areal array of measuring sites;
   (b) measuring first and second horizontal components of the earth's electric field at a plurality of measuring sites within the areal array of measuring sites, wherein the measuring sites are spaced one from another at selected distances whereby the measures of each component of the earth's electric field are spatially continuous; and
   (c) measuring first and second horizontal components of the earth's magnetic field at at least one location in the area to be surveyed.

2. The method of claim 1, wherein the areal array of measuring sites comprises a two-dimensional grid of measuring sites.

3. The method of claim 2 wherein the two-dimensional grid comprises a rectangular array of measuring sites.

4. The method of claim 1 further including:
   (a) measuring the first component of the earth's electric field $E_x$ over a first distance about each measuring site; and
   (b) spacing adjacent measuring sites for measuring the first component a fixed distance from one another, wherein the first distance over which the electric field $E_x$ is measured is at least 1/10 of the spacing between adjacent measuring sites.

5. The method of claim 4 further including:
   (a) measuring a second component of the earth's electric field $E_y$ over a second distance about each measuring site; and
   (b) spacing adjacent measuring sites for measuring the second component a fixed distance from one another, wherein the second distance over which the electric field $E_y$ is measured is at least 1/10 the spacing between adjacent measuring sites.

6. The method of claim 5 wherein the first and second distances can range from approximately 300 ft to 10,000 ft.

7. The method of claim 5 wherein the distances between adjacent measuring sites are equal.

8. A method of magnetotelluric exploration comprising the steps of:
   (a) establishing first and second areal arrays of measuring sites;
   (b) measuring a first component of the earth's electric field at a plurality of measuring sites within the first areal array of measuring sites on the earth's surface, wherein the first areal array of measuring sites includes at least two separate subarrays of substantially collinear measuring sites, wherein the measuring sites in each subarray are spaced one form another a selected distance such that the first component of the earth's electric field is spatially continuous:
   (c) measuring a second component of the earth's electric field at a plurality of measuring sites within the second areal array of measuring sites on the earth's surface encompassing generally the same region of interest as the first areal array, wherein the second areal array of measuring sites includes at least two separate subarrays of collinear measuring sites, wherein the measuring sites in each subarray are spaced one form another a selected distance such that the second component of the earth's electric field is spatially continuous and the measured first and second components of the electric field are not parallel;
   (d) measuring a first component of the earth's magnetic field at at least one measuring site within the first areal array of measuring sites; and
   (e) measuring a second component of the earth's magnetic field at at least one measuring site within the second areal array of measuring sites.

9. A method of magnetotelluric exploration, comprising the steps of:
   (a) establishing an areal array of measuring sites;
   (b) measuring first and second horizontal components of the earth's electric field at a first subarray of substantially collinear measuring sites in the areal array of measuring sites, wherein the measuring sites for measuring the first and second components of the earth's electric field are spaced one from another a selected distance whereby the first and second components of the earth's electric field is spatially continuous;
   (c) simultaneously, measuring first and second components of the earth's magnetic field; and
   (d) repeating steps (b) and (c) for a second separate subarray of substantially collinear measuring sites in the areal array of measuring sites, wherein the measuring sites in the second subarray are a selected distance from the measuring sites in the first subarray such that the measures of the earth's electric field obtained therewith are spatially continuous.

10. The method of claim 9 wherein the first and second subarrays of collinear measuring sites are substantially parallel.

11. The method of claim 9 wherein steps (a) and (b) are repeated for a plurality of additional subarrays of substantially collinear measuring sites comprising the areal array of measuring sites over the area of interest.

12. A method of magnetotelluric exploration, comprising the steps of:

(a) laying out an areal array of measurement sites on the earth's surface according to a two-dimensional coordinate system having first and second axes;

(b) simultaneously measuring first and second components of the earth's electrical field at selected of the measurement sites within the areal array, wherein the first component of the earth's electric field is measured parallel to the first axis and the second component of the earth's electric field is measured parallel to the second axis; and (c) simultaneously measuring first and second components of the earth's magnetic field at at least one location in the areal array of measurement sites, wherein the first component of the earth's magnetic field is measured parallel to the first axis, and the second component of the earth's magnetic field is measured parallel to the second axis.

13. The method of claim 12 wherein both components of the earth's electric field are spatially continuous.

14. The method of claim 12 further including:
(a) measuring the first component of the earth's electric field over a first distance l; and
(b) measuring the first component of the earth's electric field at measurement sites spaced a fixed distance L from one another.

15. The method of claim 14 wherein the fixed distance L is no greater than ten times l.

16. The method of claim 12 further including:
(a) measuring the second component of the earth's electric field over a fixed distance l; and
(b) measuring the second component of the earth's electric field at measurement sites spaced a distance L from one another.

17. The method of claim 16 wherein the fixed distance L is no greater than ten times l.

* * * * *